United States Patent [19]

Single

[11] Patent Number: 4,568,882

[45] Date of Patent: Feb. 4, 1986

[54] DIGITAL FSK DEMODULATOR CIRCUIT

[75] Inventor: Peter S. Single, Newtown, Australia

[73] Assignee: National Semiconductor Corporation, Santa Clara, Calif.

[21] Appl. No.: 655,780

[22] Filed: Oct. 1, 1984

[51] Int. Cl.[4] .......................... H03K 9/06; H03D 3/00; H03D 3/06

[52] U.S. Cl. ................................. 329/105; 329/110; 329/126; 375/45; 375/80; 375/88; 375/91

[58] Field of Search .............. 329/105, 110, 126, 166; 375/45, 80, 88, 91, 94

[56] References Cited

U.S. PATENT DOCUMENTS 4,471,312  9/1984  Severin .............................. 375/88 X
4,481,642 11/1984  Hanson .............................. 375/88 X Primary Examiner—Eugene R. LaRoche
Assistant Examiner—D. C. Mis
Attorney, Agent, or Firm—Gail W. Woodward; Paul J. Winters; Michael J. Pollock

[57] ABSTRACT

An FSK demodulator is disclosed suitable for use in a CMOS IC using switched capacitor circuits. The mark and space filters are each modified to produce sine and cosine outputs. These outputs are rectified separately and the result summed. The summed outputs are passed through low pass filters and applied to a comparator which determines which of the mark and space signals is dominant. The invention substantially reduces the size of the demodulator filter capacitors and improves the demodulation signal to noise ratio.

4 Claims, 8 Drawing Figures

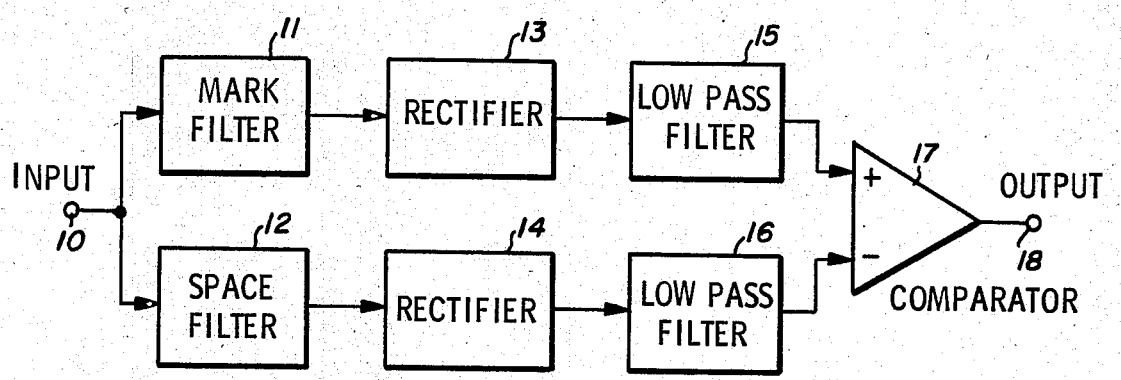
Fig_1 (PRIOR ART)
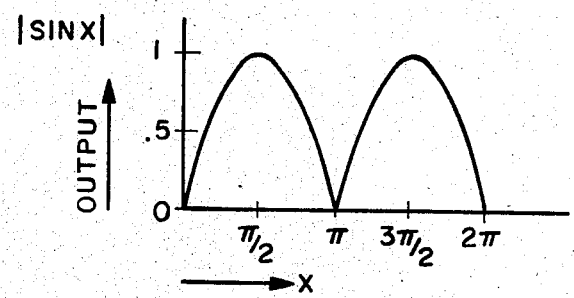
Fig_2 (PRIOR ART)
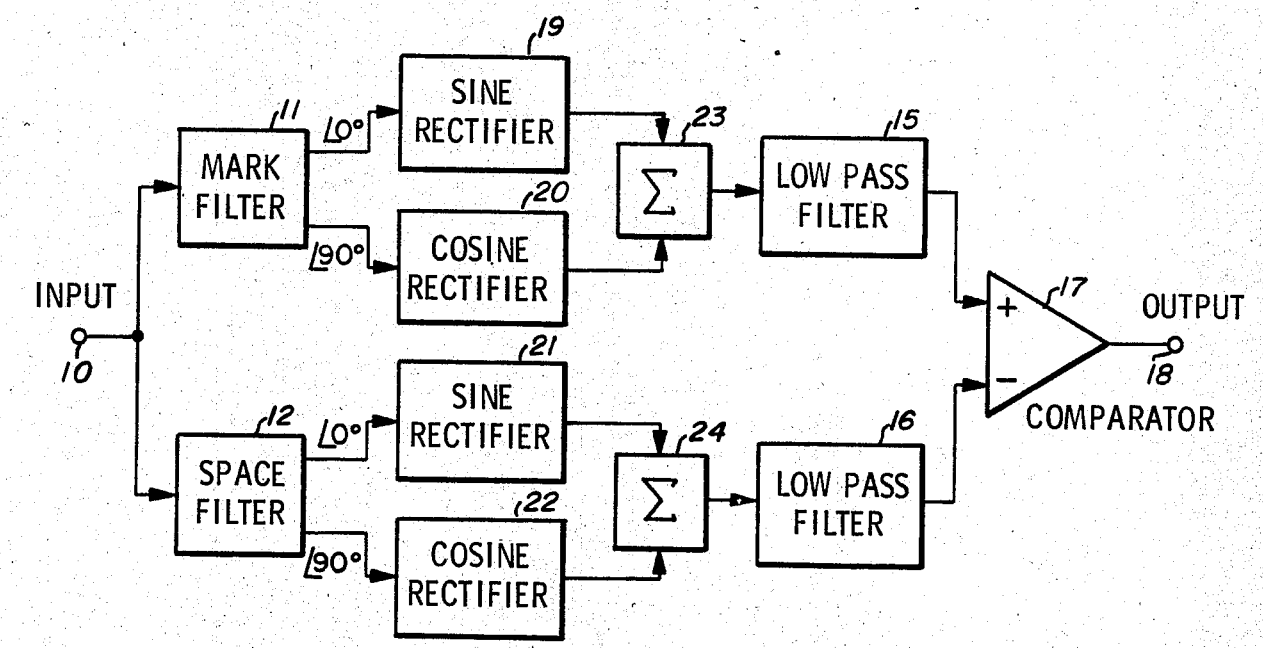
Fig_3

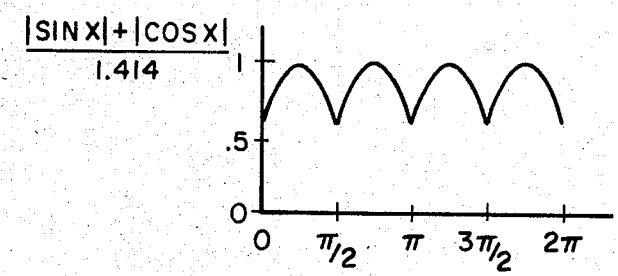
*Fig_4*
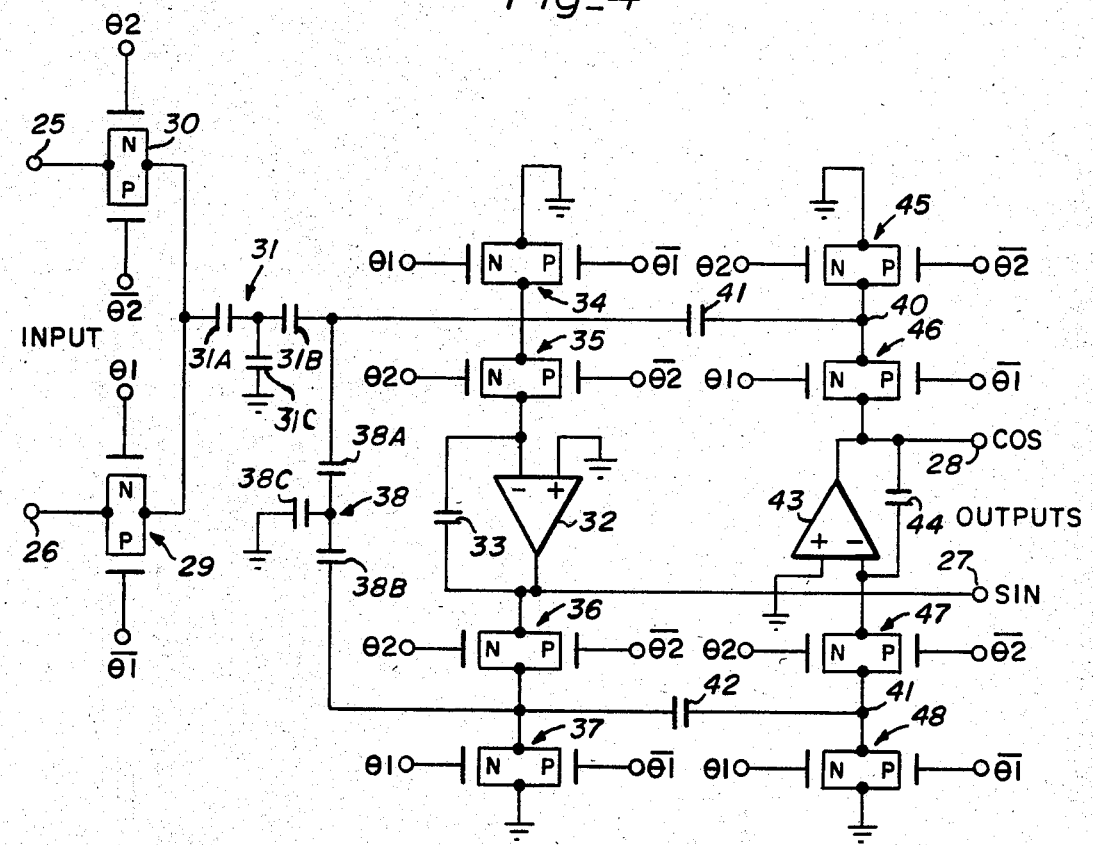
*Fig_5*

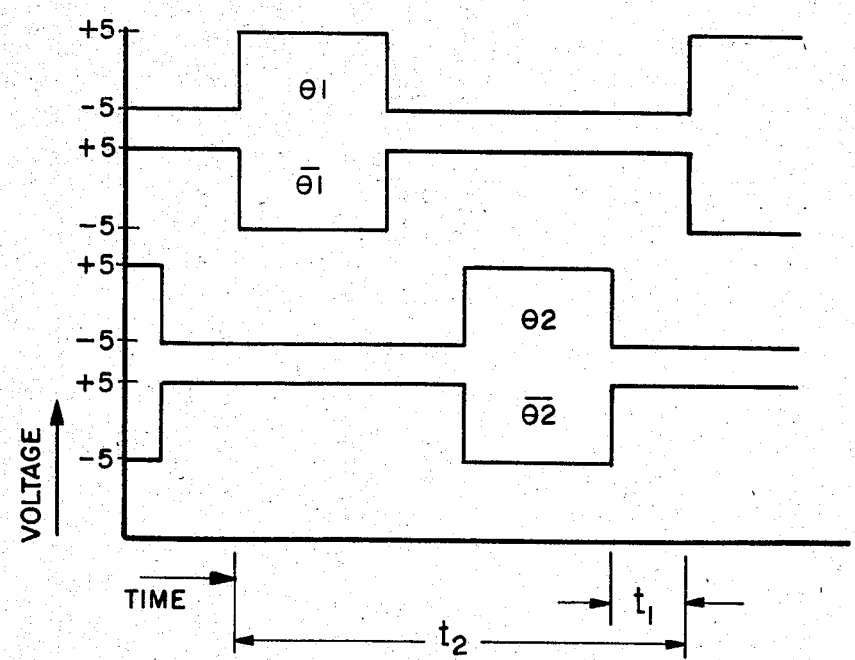
Fig_6
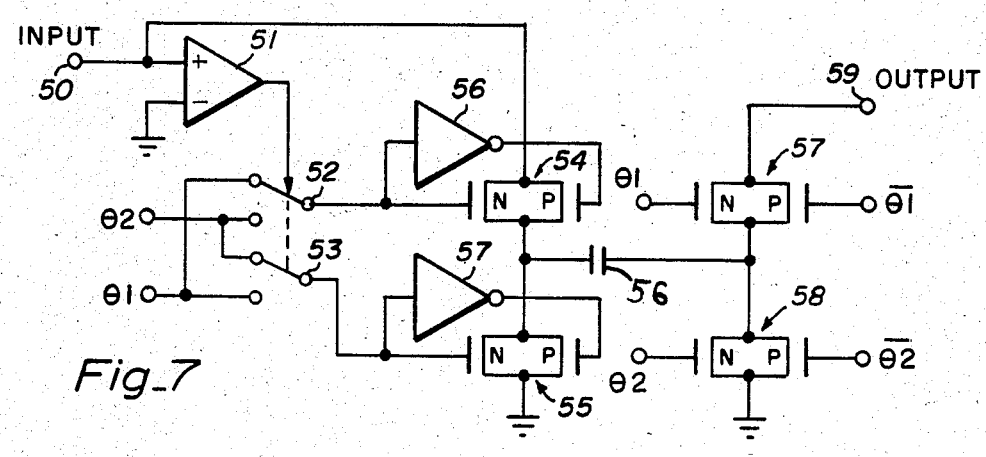
Fig_7
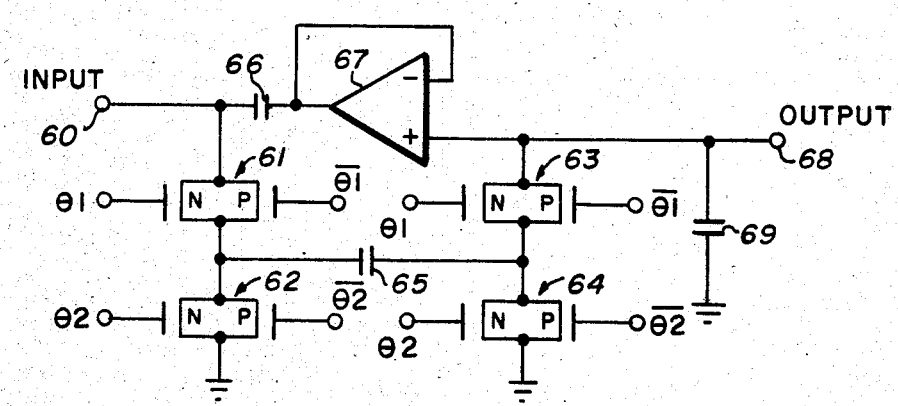
Fig_8

DIGITAL FSK DEMODULATOR CIRCUIT

BACKGROUND OF THE INVENTION

The invention relates to a circuit capable of extracting data from a signal which has been modulated by frequency shift keying (FSK). In such a system a sine wave carrier is modulated by altering its frequency. For digital data transmission the carrier has a frequency for each of the logic states employed. For example, in the well known Bell 103 standard for binary data, a space (logic zero) is represented by a 2025 Hz signal. The mark (logic one) is represented by a 2225 Hz signal. Other standards are available.

While the invention is useful in any FSK system it is of particular interest in integrated circuits. Efficient means of modulating and demodulating data have increasingly become the subject of investigation as integrated circuit technology has made digital data transfer a cost effective method of communication. Integrated circuit technology has recently made feasible the integration of complete digital modulation and demodulation systems on a single silicon chip. In so doing, it has been found that many previous architectures of FSK demodulators are unsuitable for integration, as the components required are not provided by current, cost effective integrated circuit fabrication techniques. On the other hand, previous circuit construction technologies did not provide some of the performance available in integrated circuit technologies. In integrated circuits area considerations are important because the smaller chip sizes provide economies in terms of increased device yield and lower semiconductor requirements. Since the invention results in substantially smaller capacitor values in a signal demodulator and since IC chip area is proportional to capacitor size, a significant area economy is available.

SUMMARY OF THE INVENTION

It is an object of the invention to reduce the size of the demodulator output filter components in an FSK demodulator circuit.

It is a further object of the invention to effectively multiply the carrier noise frequency in an FSK demodulator whereby the output filter requirements can be relaxed.

These and other objects are achieved as follows. Filters tuned to the mark and space frequencies are each modified to produce a sine and a cosine output. The four signals thus realized are fed to separate rectifiers for demodulation. The sine and cosine demodulated mark (or space) signals are summed and passed through a low pass filter which removes the carrier signal component. The low pass filter outputs represent a d-c signal that is proportional to the mark (or space) energy in the input carrier. The low pass filters are coupled to a comparator which senses whether a mark of space is present. Since the rectified signals that are summed prior to the low pass filters represent sine and cosine values, the rectified outputs are frequency doubled and the energy flow to the low pass filters is less discontinuous. This means that the low pass filter requirements are substantially reduced. The signal delay is also reduced so that the output comparator can act more rapidly.

BRIEF DESCRIPTION OF THE DRAWING

FIG. 1 is a block diagram of a prior art FSK demodulator.

FIG. 2 is a graph plotting the output of the rectifier circuit of FIG. 1.

FIG. 3 is a block diagram of the circuit of the invention.

FIG. 4 is a graph plotting the output of the rectifier and summer circuits of FIG. 3.

FIG. 5 is a schematic diagram of a CMOS embodiment of the mark and space filters of FIG. 3.

FIG. 6 is a graph showing the clock timing signals for the circuit of FIG. 5.

FIG. 7 is a schematic diagram of the rectifiers of FIG. 5.

FIG. 8 is a schematic diagram of the low pass filters of FIG. 5.

DESCRIPTION OF THE PRIOR ART

FIG. 1 is a block diagram of a typical prior art FSK demodulator. Input terminal 10 applies the input signal to two bandpass fiters 11 and 12 which are respectively tuned to the mark and space signal frequencies. Rectifiers 13 and 14 act to detect the mark and space signals. Low pass filters 15 and 16 remove the signal frequency components from the detected mark and space signals. Thus, the d-c signal values fed to comparator 17 represent the energy values in the input signals that fall within the bandpass limits of filters 11 and 12. Depending upon whether a mark or space signal dominates, the output of comparator 17 at terminal 18 will be high or low respectively. In this way the circuit noise rejection is good.

FIG. 2 is a graph showing the amplitude response of the rectifier circuit of FIG. 1 to a sine wave input. It can be seen that the vertical coordinate rises to unity at $\pi/2$ and $3\pi/2$ while it goes to zero at $\pi$ and $2\pi$. In effect, the negative half of the input sine wave has been inverted and placed above the zero level. This is simply full wave rectification. Basically, the low pass filters must deal with a signal that has a peak ripple equal to unity and contains a main signal component of twice the input frequency.

A significant problem with the integration of such a demodulator is the silicon area required for the low pass filters 15 and 16. These filters are required to remove the harmonic frequency products generated by the rectification of the carrier, otherwise these products constitute noise at the input of the comparator, and interfere with the demodulation process. These filters are difficult to integrate, as the very low corner frequencies of these filters necessitates the use of large areas of silicon for their integration.

DESCRIPTION OF THE INVENTION

FIG. 3 is a block diagram of the FSK demodulator of the invention. Where the parts function in a similar manner to those of FIG. 1 the same numerals are used.

The mark filter 11 and space filter 12 are conventional except that each has an extra output. In this case there are quadruature-related sine and cosine outputs for each filter. Each of the four filter outputs is full wave rectified in rectifiers 19-22. The sine and cosine rectified outputs from filter 11 are combined in summer 23 which drives low pass filter 15. Similarly, the outputs of sine rectifier 21 and cosine rectifier 22 are combined in summer 24 which drives low pass filter 16.

FIG. 4 is a graph showing the outputs of summers 23 and 24. The signal has been normalized at unity by dividing it by 1.414. Comparison of the waveforms of FIGS. 2 and 4 indicates that in the prior art circuit the first harmonic which must be removed is one octave above the fundamental frequency of the carrier. In the circuit of the invention the first harmonic which must be removed is two octaves above the fundamental. This doubling of frequency of this noise component results in more attenuation of this noise component than would be achieved with the prior art circuit. This reduction complements the previously mentioned harmonic signal reduction of the invention.

DESCRIPTION OF THE PREFERRED EMBODIMENT

The following description shows a CMOS form of circuit construction of the invention. Since the various elements are well known in the art their details will not be enlarged upon. It is to be understood that other forms of IC construction could be employed.

FIG. 5 is a filter circuit for performing the mark filter 11 and space filter 12 functions. Input terminals 25 and 26 represent the noninverting and inverting filter inputs respectively. The filter is designed using a well known "biquadratic" topology. Output terminal 27 provides a sine output while output terminal 28 provides a cosine output.

The switched filter circuit uses input transmission gate switches 29 and 30 which are alternately clocked by $\theta1$ and $\theta2$ respectively to drive a capacitor T network 31. Op Amp 32 is converted to an integrator by capacitor 33 and in conjunction with clocked transmission gates 34–37 develops a sine output at terminal 27. Capacitor T 38 has its input coupled to the output of capacitor T 31 and drives node 39 which is the junction of transmission gates 36 and 37.

Capacitors 41 and 42 respectively couple the outputs of capacitor T 31 and capacitor T 38 to nodes 40 and 41. Op Amp 43 is converted to an integrator by capacitor 44. Transmission gates 45–48 operate with Op Amp 43 to produce a cosine wave signal output at terminal 28.

FIG. 6 is a graph showing the waveforms of $\theta1$ and $\theta2$ as employed in the circuit of FIG. 5. The pulses are made non-overlapping by the $t_1$ time increment. The clock pulses have a period of $t_2$. $\theta1$ and $\theta2$ alternatively switch the N channel transistors on while $\overline{\theta1}$ and $\overline{\theta2}$ alternately switch the p channel transistors on. The pulse period $t_2$ is made small with respect to the period of the FSK or data signals.

FIG. 7 is a schematic diagram of a rectifier circuit suitable for performing the function of blocks 19–33 of FIG. 3. Input terminal 50 receives a signal from one of the mark or space filters (11 or 12). Comparator 51 senses whether the input is above or below ground. Switches 52 and 53 will be in the positions shown (up) when the input voltage is above ground. When the input goes below ground, comparator 51 will drive switches 52 and 53 to their lower positions. Transmission gates 54 and 55 are operated sequentially by $\theta1$ and $\theta2$ and their drive sense is controlled by the polarity of the input signal. Capacitor 56 couples the node between transmission gates 54 and 55 to the node between transmission gates 57 and 58 which are operated sequentially by $\theta1$ and $\theta2$. Thus, for positive input cycles, transmission gats 54 and 57 (and also 55 and 58) are operated in synchronism. However, for negative input half cycles the operating phases of transmission gates 54 and 55 is reversed so the negative half cycle inputs appear at terminal 59 inverted. Thus, the output at terminal 59 is the full wave rectified input signal from the related mark or space filter output.

Two of the FIG. 7 circuits will have their output terminals coupled to input terminal 60 of FIG. 8 which therefore acts as a summer. The circuit shown further includes a low pass filter of the well known "Sallen Key" topology. Transmission gates 61 and 62 are operated conventionally by the $\theta1$ and $\theta2$ clock signals and their common node is coupled via capacitor 65 to the common node of transmission gates 63 and 64. Output capacitor 69 is made relatively large so that its charge can only vary slowly. In effect, a relatively large number of incremental charges from capacitor 65 will be needed to vary the charge on capacitor 69. Capacitor 66 provides positive feedback coupling isolated by unity gain buffer 67. The summed and filtered inputs appear at output terminal 68. The outputs of the two low pass filters are coupled to a conventional comparator (17 of FIG. 3). This comparator will produce a digital output, logic one or zero, depending upon which of the mark or space signals dominates.

EXAMPLE

The circuit of FIG. 3 was constructed using the schematic diagrams of FIGS. 5, 7 and 8. Conventional CMOS IC construction was employed. The following capacitors in ½ pf values were employed.

| CAPACITOR | MARK FILTER 11 | SPACE FILTER 12 |
| --- | --- | --- |
| 31A | 1 | 1 |
| 31B | 1 | 1 |
| 31C | 4.3 | 4.9 |
| 38A | 1 | 1 |
| 38B | 1 | 1 |
| 38C | 2.2 | 2.6 |
| 41 | 2 | 2 |
| 42 | 2 | 2 |
| 33 | 17.6 | 16 |
| 44 | 17.6 | 16 |

| CAPACITOR | RECTIFIER AND LOW PASS FILTER |
| --- | --- |
| 56 | 0.5 |
| 65 | 0.5 |
| 66 | 55 |
| 59 | 12.5 |

Four rectifier circuits of the FIG. 7 variety were employed, two each for mark filter 11 and space filter 12. Two FIG. 8 summer and low pass filter circuits were used to combine and filter the rectified signals. The rectifier and low pass filter circuits were operated at a clock frequency that was ¼ of the clock frequency of the filters. The clock frequencies were 28 kHz and 112 kHz respectively which provides a low pass filter corner frequency of 240 Hz. The low pass filter outputs were coupled to a comparator, the output of which indicated whether a mark or space signal was present.

The circuit performed in accordance with the above-mentioned "Bell 103" standard. It was useful in detecting a 300 Baud data signal and had a 14 db greater signal to noise ratio compared with the prior art circuit.

The total area of capacitors 66 and 69 (two of each) which dominate the topology, was about 675 mils$^2$ (0.435 mm$^2$). Using the approach of the prior art, the equivalent chip area would have been about 1000 mils$^2$ (0.645 mm$^2$).

The invention has been described and a working example given. When a person skilled in the art reads the foregoing description, alternatives and equivalents, within the spirit and intent of the invention, will be apparent. Accordingly, it is intended that the scope of the invention be limited only by the claims that follow.

I claim:

1. An FSK demodulator circuit comprising:
   an input terminal coupled to drive mark and space bandpass filters, each having a pair of quadrature related outputs;
   means for rectifying each of the outputs of said bandpass filters;
   means for summing the quadrature related and rectified mark bandpass filter outputs;
   means for summing the quadrature related and rectified space bandpass filter outputs; and
   means for passing each of the summed signals through low pass filter means.

2. The circuit of claim 1 further including means for comparing the signals obtained at the low pass filter outputs.

3. The circuit of claim 2 wherein said bandpass filters are of the switched capacitor biquadratic topology and each one is configured to produce a sine output and a cosine output.

4. The circuit of claim 3 wherein said low pass filter means comprise switched capacitor Sallen Key topology circuits.

* * * * *